(12) United States Patent
Park et al.

(10) Patent No.: US 9,870,647 B2
(45) Date of Patent: Jan. 16, 2018

(54) SYSTEM AND METHOD FOR PROCESSING COLOR OF THREE-DIMENSIONAL OBJECT

(71) Applicant: SAMSUNG SDS CO., LTD., Seoul (KR)

(72) Inventors: Jae-Young Park, Seoul (KR); Sung-Ho Jang, Seoul (KR); Kwang-Min Choi, Seoul (KR); Sang-Hoon Han, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 15/032,250

(22) PCT Filed: Jun. 12, 2015

(86) PCT No.: PCT/KR2015/005962
§ 371 (c)(1),
(2) Date: Apr. 26, 2016

(87) PCT Pub. No.: WO2016/186236
PCT Pub. Date: Nov. 24, 2016

(65) Prior Publication Data
US 2017/0116787 A1  Apr. 27, 2017

(30) Foreign Application Priority Data

May 20, 2015 (KR) .......................... 10-2015-0070228

(51) Int. Cl.
*G06T 19/20* (2011.01)
*G06T 7/90* (2017.01)
(Continued)

(52) U.S. Cl.
CPC .......... *G06T 19/20* (2013.01); *B29C 67/0088* (2013.01); *B33Y 50/02* (2014.12);
(Continued)

(58) Field of Classification Search
CPC ..................................................... G06T 19/20
(Continued)

(56) References Cited

U.S. PATENT DOCUMENTS

2009/0012640 A1  1/2009  Wu et al.
2011/0087350 A1  4/2011  Fogel et al.
(Continued)

FOREIGN PATENT DOCUMENTS

JP        4761372 B2       8/2011
JP        2015-49748 A     3/2015
KR   10-2013-0060144 A     6/2013

OTHER PUBLICATIONS

International Search Report dated Feb. 18, 2016 issued by the International Searching Authority in counterpart International Application No. PCT/KR2015/005962 (PCT/ISA/210).
(Continued)

*Primary Examiner* — Devona Faulk
*Assistant Examiner* — Hai Tao Sun
(74) *Attorney, Agent, or Firm* — Sughrue Mion, PLLC

(57) ABSTRACT

The specification of the instant application is amended. Submitted herewith is a Substitute Specification. The Substitute Specification complies with 37 C.F.R. §§1.52(a)-(b) and 1.125(b), and no new matter has been added to the Substitute Specification. Submitted herewith are clean and marked up versions of Substitute Specification in compliance with 37 C.F.R. §§1.121(b)(3) and 1.125(c). Entry of the Substitute Specification is respectfully requested.

8 Claims, 9 Drawing Sheets

(51) Int. Cl.
*B29C 67/00* (2017.01)
*B33Y 50/02* (2015.01)

(52) U.S. Cl.
CPC ........ *G06T 7/90* (2017.01); *B29K 2995/0021* (2013.01); *G06T 2207/10024* (2013.01); *G06T 2207/10028* (2013.01); *G06T 2219/2012* (2013.01)

(58) Field of Classification Search
USPC .......................................................... 345/426
See application file for complete search history.

(56) References Cited

U.S. PATENT DOCUMENTS

| | | | |
|---|---|---|---|
| 2011/0222081 A1 | 9/2011 | Yi et al. | |
| 2012/0255663 A1* | 10/2012 | Holroyd | B29C 67/0074 156/64 |
| 2014/0184593 A1 | 7/2014 | Somapalan et al. | |
| 2014/0324204 A1* | 10/2014 | Vidimce | B29C 67/0088 700/98 |

OTHER PUBLICATIONS

Written Opinion dated Feb. 18, 2016 issued by the International Searching Authority in counterpart International Application No. PCT/KR2015/005962 (PCT/ISA/237).

Communication dated Aug. 1, 2017 issued by the Korean Intellectual Property Office in counterpart Korean Patent Application No. 10-2015-0070228.

\* cited by examiner

SYSTEM AND METHOD FOR PROCESSING COLOR OF THREE-DIMENSIONAL OBJECT

CROSS REFERENCE TO RELATED APPLICATIONS

This application is a National Stage entry of International Application No. PCT/KR2015/005962 filed Jun. 12, 2015, which claims priority to and the benefit of Korean Patent Application No. 10-2015-0070228, filed on May 20, 2015, the disclosure of which is incorporated herein by reference in its entirety.

BACKGROUND

1. Field

The present invention relates to a technology for determining a color of an outside and an inside of a three-dimensional object.

2. Description of Related Art

Recently, use of a three-dimensional (3D) printer is increasing, and, in particular, a 3D printer that can support multiple materials and colors is widely used. However, according to the conventional method of processing colors in a 3D printer or the conventional image file format that is input into a 3D printer, it is difficult to effectively output a 3D output product having multiple materials or multiple colors. For example, an STL file, which is the most frequently used in a 3D printer, includes only appearance information of a 3D object, so there is a difficulty in assigning material or color information to a 3D output product output according to the STL file.

In addition, U.S. Patent Registration Notification No. U.S. Pat. No. 7,991,498 suggests a technology for dividing the surface of a 3D object in units of cells, and assigning colors to the respective color cells. The method can assign colors to a 3D object that has a simple shape or a simple color, but has difficulty in being applied to a 3D object that has a complicated shape or various colors. According to the conventional technology, there is limitation in dividing the surface of a 3D object and assigning a color to each divided surface, and in particular, a 3D object having a complicated shape is subject to difficulty in elaborate color processing.

PRIOR ART DOCUMENT

Patent Document (Patent Document 1) U.S. Patent Registration Notification No. U.S. Pat. No. 7,991,498 (Aug. 2, 2011)

SUMMARY

Disclosure

Technical Problem

Embodiments of the present invention is directed to providing a technology for a system and method for effectively processing colors of the outside and inside of a three-dimensional (3D) object by using appearance information of the 3D object and color information of an outer surface of the 3D object.

Technical Solution

According to an exemplary embodiment of the present invention, there is provided a system for processing a color of a three-dimensional (3D) object, the system comprising a file input part, a coordinate extractor, and a color processor. The file input part may be configured to receive a 3D modeling file that comprises appearance information of a 3D object and color information of an outer surface of the 3D object. The coordinate extractor may be configured to extract inner coordinates inside the 3D object and are positioned within an offset distance set from the outer surface of the 3D object. The color processor may be configured to assign color information to the inner coordinates based on the appearance information and the color information of the outer surface.

The appearance information may comprise normal vectors of a plurality of outer surfaces that form the 3D object and a plurality of surface coordinates on the plurality of outer surfaces, and the color information may comprise a plurality of image coordinates corresponding to the plurality of surface coordinates.

The color processor may be configured to determine at least one candidate plane among a plurality of outer planes formed by extending the plurality of outer surfaces, to select one of the plurality of surface coordinates on a candidate plane as target coordinates, and to assign color information of image coordinates corresponding to the target coordinates to the inner coordinates.

The color processor may be configured to determine at least one outer plane, among the plurality of outer planes whose shortest distance from the inner coordinates is smaller than a preset value as the candidate plane.

The color processor may be configured to extract coordinates among coordinates on the candidate plane, whose distance to the inner coordinates is the shortest with respect to each of the at least one candidate plane, and may be further configured to select the target coordinates based on the extracted coordinates.

In response to at least one surface coordinates on the candidate plane correspond to the extracted coordinates, the color processor may be configured to select surface coordinates, among the at least one surface coordinates on the candidate planes whose distance to the inner coordinates is shortest as the target coordinates.

In response to no surface coordinates on the candidate plane correspond to the extracted coordinates, the color processor may be configured to select surface coordinates, among surface coordinates positioned on an edge or a vertex formed by the outer surfaces on the candidate planes whose distance to the inner coordinates is shortest as the target coordinates.

In response to a distance from the target coordinates to the inner coordinates is equal to or smaller than the offset distance, the color processor may be configured to assign color information of image coordinates corresponding to the target coordinates to the inner coordinates.

According to another exemplary embodiment of the present invention, there is provided a method for processing a color of a three-dimensional (3D) object, the method comprising: receiving, by a file input part, a 3D modeling file that comprises appearance information of a 3D object and color information of an outer surface of the 3D object; extracting, by a coordinate extractor, inner coordinates inside the 3D object and are positioned within an offset distance set from the outer surface of the 3D object; and assigning, by a color processor, color information to the inner coordinates based on the appearance information and the color information of the outer surface.

The appearance information may comprise normal vectors of a plurality of outer surfaces that form the 3D object and a plurality of surface coordinates on the plurality of outer surfaces, and the color information may comprise a plurality of image coordinates corresponding to the plurality of surface coordinates.

The assigning of color information to the inner coordinates may comprise: determining at least one candidate plane among a plurality of outer planes formed by extending the plurality of outer surfaces; selecting one of the plurality of surface coordinates on the candidate plane as target coordinates, and assigning color information of image coordinates corresponding to the target coordinates to the inner coordinates.

The determining of at least one candidate plane may comprise determining at least one outer plane, among the plurality of outer planes whose shortest distance from the inner coordinates is smaller than a preset value as the candidate plane.

The selecting of surface coordinates on the candidate plane as target coordinates may comprise: extracting coordinates, among coordinates on the candidate plane whose distance to the inner coordinates is shortest with respect to each of the one or more candidate planes; and selecting the target coordinates based on the extracted coordinates.

The selecting of the target coordinates based on the extracted coordinates may comprise, in response to at least one surface coordinates on the candidate plane correspond to the extracted coordinates, selecting surface coordinates, among the at least one surface coordinates on the candidate planes whose distance to the inner coordinates is shortest as the target coordinates.

The selecting of the target coordinates based on the extracted coordinates may comprise, in response to no surface coordinates on the candidate plane correspond to the extracted coordinates, selecting surface coordinates, among surface coordinates positioned on an edge or a vertex formed by the outer surfaces on the candidate planes whose distance to the inner coordinates is shortest as the target coordinates.

The assigning of color information of image coordinates corresponding to the target coordinates to the inner coordinates may comprise, in response to a distance from the target coordinates to the inner coordinates is equal to or smaller than the offset distance, assigning color information of image coordinates corresponding to the target coordinates to the inner coordinates.

According to another exemplary embodiment of the present invention, there is provided a computer program stored in a recording media to perform, in combination with hardware, steps including: receiving, by a file input part, a 3D modeling file that comprises appearance information of a 3D object and color information of an outer surface of the 3D object; extracting, by a coordinate extractor, inner coordinates inside the 3D object and are positioned within an offset distance set from the outer surface of the 3D object; and assigning, by a color processor, color information to the inner coordinates based on the appearance information and the color information of the outer surface.

Advantageous Effects

According to embodiments of the present invention, the system and method for processing color of a three-dimensional (3D) object according to the exemplary embodiments of the present invention can determine an inside color of a 3D object by using color information of an outer surface without a process of dividing the outer surface of the 3D object. In particular, the inside color of the 3D object can be effectively determined by using the color information of an outer surface that has an impact on the inside color of the 3D object.

In addition, according to the exemplary embodiments of the present invention, only inner coordinates positioned within an offset distance set from the outer surface of a 3D object among coordinates existing inside the 3D object are assigned color information, thereby minimizing the amount of calculation of assignment of the color information.

DETAILED REVIEW OF EXEMPLARY EMBODIMENTS

Exemplary embodiments of the present invention will be described in detail below with reference to the accompanying drawings. The following description is intended to provide a general understanding of the method, apparatus and/or system described in the specification, but it is illustrative in purpose only and should not be construed as limiting the present invention.

In describing the present invention, detailed descriptions that are well-known but are likely to obscure the subject matter of the present invention will be omitted in order to avoid redundancy. The terminology used herein is defined in consideration of its function in the present invention, and may vary with an intention of a user and an operator or custom. Accordingly, the definition of the terms should be determined based on an overall content of the specification. The terminology used herein is for the purpose of describing particular embodiments only and is not intended to be limiting of the present inventive concept. As used herein, the singular forms "a," "an" and "the" are intended to include the plural forms as well unless the context clearly indicates otherwise. It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
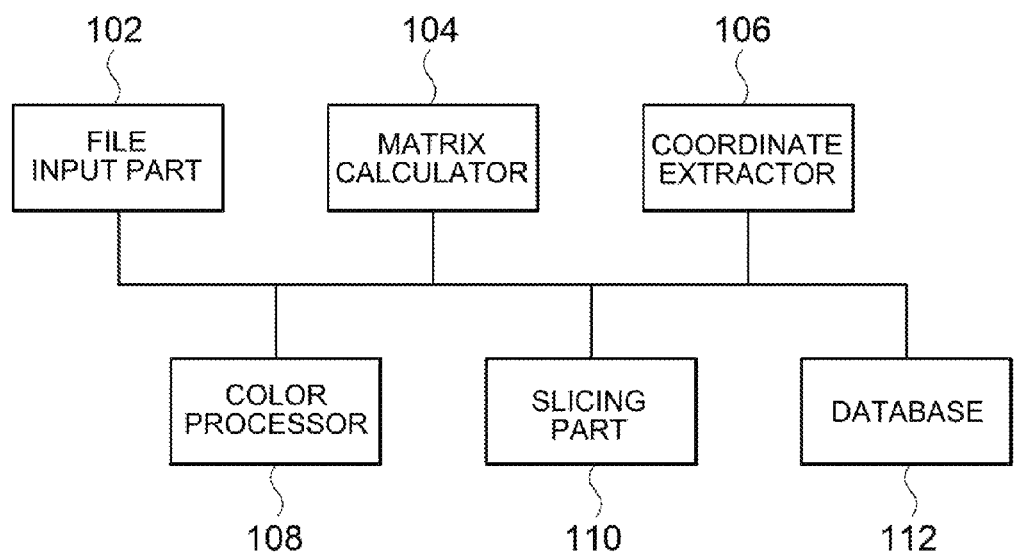
FIG. 1 is a block diagram illustrating a detailed configuration of a system for processing a color of a three-dimensional (3D) object according to an exemplary embodiment of the present invention.

FIG. 1 is a block diagram illustrating a detailed configuration of a system for processing a color of a three-dimensional (3D) object according to an exemplary embodiment of the present invention. Referring to FIG. 1, a 3D object color processing system 100 according to an exemplary embodiment of the present invention includes a file input part 102, a matrix calculator 104, a coordinate extractor 106, a color processor 108, a slicing part 110, and a database 112.

The file input part 102 receives a 3D modeling file from a user terminal (not shown). The user terminal represents an apparatus for inputting a 3D modeling file to the file input part 102, for example, a laptop computer, a tablet computer, a smartphone, a personal digital assistance (PDA), or a wearable device such as a smart watch.

The 3D modeling file is a file used to output a 3D object from a 3D output apparatus (not shown), such as a 3D printer. For example, the 3D modeling file may include an OBJ file, a VRML file, or an AMF file. The 3D modeling file may include appearance information of a 3D object and material information of an outer surface of the 3D object. The appearance information of a 3D object may include normal vectors of a plurality of outer surfaces forming the 3D object and surface coordinates existing on the outer surfaces of the 3D object. The surface coordinates may be 3D-space coordinates existing on the outer surfaces of the 3D object, for example, in the form of (x, y, z). All positions on the outer surfaces of the 3D object may be represented by a normal vector and surface coordinates. In addition, the material information of the outer surface of the 3D object is information representing material and texture of the outer surface, and may include color information of the outer surface. The color information of the outer surface may include two-dimensional (2D) image coordinates corresponding to the surface coordinates, and the image coordinates may be composed in the form of (u, v).

The matrix calculator 104 calculates a transformation matrix by using the 3D modeling file received from the file input part 102. The transformation matrix means a matrix representing a correspondence (a correlation) between surface coordinates on the outer surface of the 3D object and color information assigned to the surface coordinates, that is, image coordinates. For example, assuming that surface coordinates (x1, y1, z1) on an outer surface vn1 are assigned image coordinates (u1, v1), and surface coordinates (x2, y2, z2) on an outer surface vn2 are assigned image coordinates (u2, v2), the matrix calculator 104 may calculate a transformation matrix representing a correlation between (x1, y1, z1) and (u1, v1) and a transformation matrix representing a correlation between (x2, y2, z2) and (u2, v2). The transformation matrix may be used, when certain surface coordinates existing on an outer surface of a 3D object are given, to convert the surface coordinates into 2D image coordinates corresponding thereto such that color information assigned to the surface coordinates are extracted. In addition, as will be described below, the color processor 108 may assign color information to inner coordinates of a 3D object by using the transformation matrix. Meanwhile, a method of calculating a transformation matrix by using a correspondence between 3D space coordinates and 2D image coordinates is a generally known technology, and thus detailed description thereof will be omitted.

The coordinate extractor 106 extracts inner coordinates existing inside a 3D object and positioned within an offset distance that is set from the outer surface of the 3D object. The inner coordinates represent coordinates which are assigned color information among coordinates existing inside a 3D object. If all coordinates existing inside a 3D object are assigned color information, the amount of calculation of color information assignment is great. In addition, because a 3D object has a predetermined transparency, a color of coordinates a predetermined distance or more away from an outer surface of the 3D object does not have an impact on a color seen from the exterior. According to the exemplary embodiment of the present invention, color information is assigned only to inner coordinates positioned within an offset distance that is set from the outer surface of a 3D object among coordinates inside the 3D object, thereby minimizing the calculation of as assignment of color information. The coordinate extractor 106 may receive information of an offset distance from a user terminal and extract inner coordinates existing inside a 3D object and positioned within the offset distance from an outer surface of the 3D object. The offset distance according to an example may be 3 cm, 5 cm, etc., but the offset distance is not limited thereto and may vary with the transparency of a 3D object.

The color processor 108 assigns color information to the inner coordinates extracted by the coordinate extractor 106. The color processor 108 may assign color information to the inner coordinates by using appearance information of the 3D object and color information of an outer surface of the 3D object that are included in the 3D modeling file. In this case, the color processor 108 selects an outer surface that is nearest to the extracted inner coordinates among outer surfaces of the 3D object, and assigns image coordinates corresponding to surface coordinates on the selected outer surface to the inner coordinates. The color processor 108 may calculate a shortest distance from the inner coordinates to each outer surface in order to select an outer surface that is nearest to the inner coordinates. However, searching for all the outer surfaces, measuring shortest distances from the inner coordinates to each outer surface, and selecting an outer surface requires a great amount of calculation. According to the exemplary embodiments of the present invention, in order to reduce the amount of calculation, an outer plane that has an impact on a color of inner coordinates is determined, and only a shortest distance between the outer plane and the inner coordinates is measured.

To this end, the color processor 108 may determine one or more candidate planes among a plurality of outer planes that are formed by extending a plurality of outer surfaces constituting the 3D object. The candidate plane represents a plane including an outer surface that has an impact on inner coordinates. The color processor 108 may determine one or more outer planes whose shortest distance from the inner coordinates is within a preset value among the plurality of outer planes as the candidate planes. The preset value according to an example may be 5 cm, 10 cm, etc., but the present value is not limited thereto and may vary with the transparency of the 3D object.

The color processor 108 may extract coordinates whose distance to the inner coordinates is the shortest among coordinates on the candidate plane with respect to each of the candidate planes. For example, assuming that a first candidate plane to a third candidate plane exist, the color processor 108 may extract coordinates (x1, y2, z3) whose distance to the inner coordinates is the shortest among coordinates on the first candidate plane, extract coordinates (x2, y3, z4) whose distance to the inner coordinates is the shortest among coordinates on the second candidate plane, and extract coordinates (x3, y4, z5) whose distance to the inner coordinates is the shortest among coordinates on the third candidate plane.

Then, the color processor 108 removes coordinates whose distance to the inner coordinates exceeds the offset distance among the extracted coordinates. The color processor 108 calculates a distance between the extracted coordinates and the inner coordinates, and if the calculated distance is larger than the offset distance, removes the extracted coordinates.

Then, the color processor 108 determines whether coordinates other than the removed coordinates exist on the outer surface of the 3D object (that is, whether each of the extracted coordinates represent surface coordinates). If there are coordinates existing on the outer surface of the 3D object among the extracted coordinates, the color processor 108 may select surface coordinates whose distance to the inner coordinates is the shortest among coordinates existing on the outer surface of the 3D object (for example, x2, y2, z2) as target coordinates.

When all of the extracted coordinate do not exist on the outer surface of the 3D object, the color processor 108 may select surface coordinates whose distance to the inner coordinates is the shortest among surface coordinates positioned on an edge or a vertex formed by outer surfaces on the candidate planes as the target coordinates. In this case, the shortest distance between the inner coordinates and the target coordinates may be the shortest distance between the inner coordinates and the edge, or the shortest distance between the inner coordinates and the vertex The target coordinates represent coordinates having the greatest impact on color information that is assigned to the inner coordinates among surface coordinates on the outer surface of the 3D object. The color processor 108 may assign color information of image coordinates corresponding to the target coordinates to the inner coordinates. As described above, the matrix calculator 104 may calculate a transformation matrix that represents a correspondence between surface coordinates and image coordinates corresponding to the surface coordinates, and the color processor 108 may assign color information to the inner coordinates of the 3D object by using the calculated transformation matrix. That is, the color processor 108 may obtain image coordinates corresponding to the target coordinates by using the transformation matrix, and may assign color information of the obtained image coordinates to the inner coordinates. Through this process, the target coordinates and the inner coordinates may have the same color information.

In addition, the color processor 108 may allow saturation and brightness of color information assigned to inner coordinates to be varied with a distance from the target coordinates to the inner coordinates. For example, as a distance from the target coordinates to the inner coordinates increases, the impact of the inner coordinates on color that is seen from the exterior may be lowered. Accordingly, the color processor 108 may decrease a saturation of color information assigned to the inner coordinates as the distance from the target coordinates to the inner coordinates increases.

The slicing part 110 generates per-layer images for outputting a 3D object. According to the above described process, the color processor 108 may assign color information to all inner coordinates positioned within an offset distance that is set from outer surfaces, thereby generating a 3D image that represents an appearance of a 3D object and colors of an inside and an outside of the 3D object. The slicing part 110 may slice the 3D image, thereby generating 2D per-layer images.

The slicing part 110 may store the generated per-layer images in the database 112. In addition, the slicing part 110 may transmit the generated per-layer images to a 3D output apparatus. The 3D output apparatus may consecutively output the per-layer images received from the slicing part 110.

The database 112 is a storage in which the per-layer images generated by the slicing part 110 are stored. The slicing part 110 may generate per-layer images as described above, and may store the generated per-layer images in the database 112.

According to an exemplary embodiment of the present invention, the file input part 102, the matrix calculator 104, the coordinate extractor 106, the color processor 108, the slicing part 110 and the database 112 may be implemented on a computing device including one or more processors and a computer readable recording media connected to the one or more processors. The computer readable recording medium may be provided inside or outside the processor, and may be connected to the processor by various well-known means. The processor in the computing device may enable the computing device to operate according to the exemplary embodiment described in the specification. For example, the processor may execute an instruction stored in the computer readable recording medium, and the instruction stored in the computer readable recording medium, being executed by the processor, may allow the computing device to perform steps according to the exemplary embodiment of the present invention described in the specification.

Figure 2:
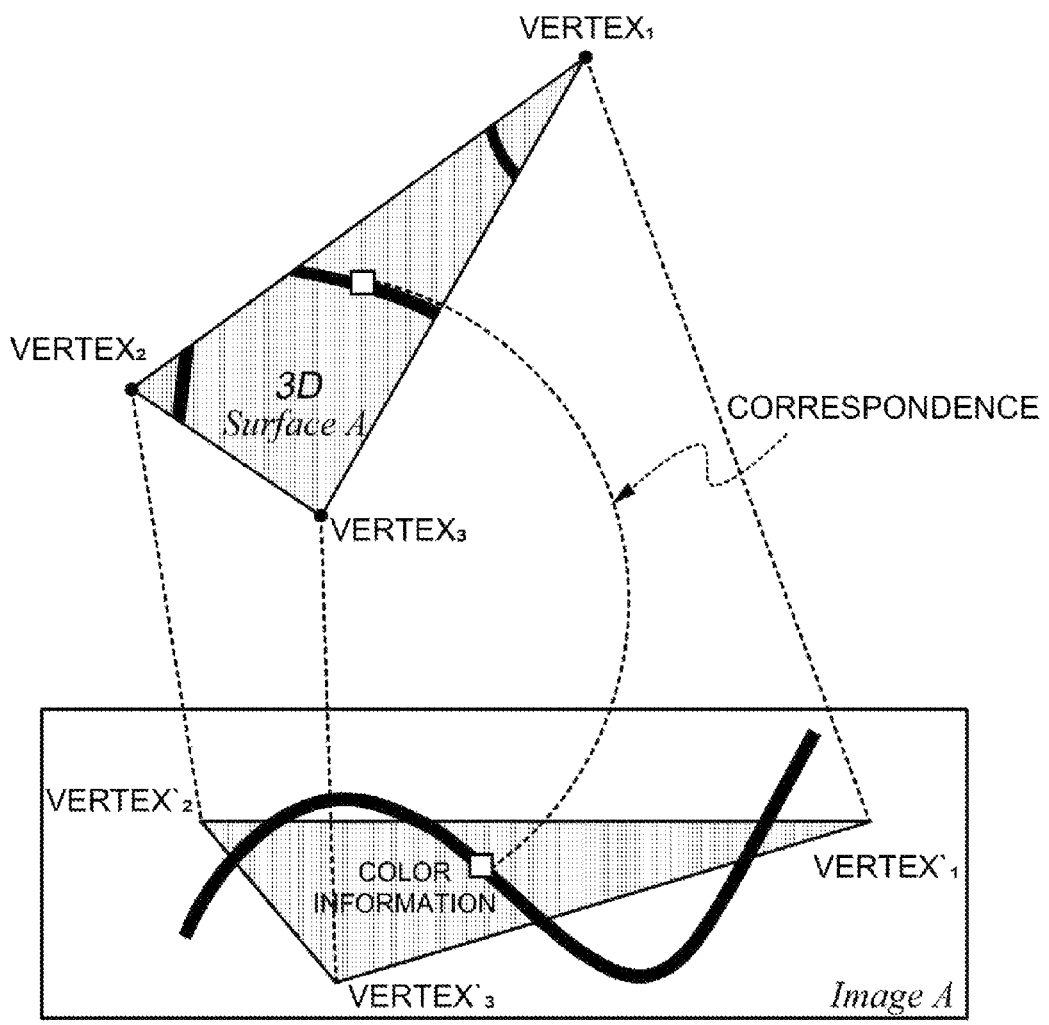
FIG. 2 is a diagram illustrating a correspondence between surface coordinates and image coordinates according to an exemplary embodiment of the present invention.

FIG. 2 is a diagram illustrating a relationship between surface coordinates and image coordinates according to an exemplary embodiment of the present invention. As described above, the matrix calculator 104 may calculate a transformation matrix by using the 3D modeling file that is input from the file input part 102, and the transformation matrix may represent a correspondence between surface coordinates on an outer surface of a 3D object and color information assigned to the surface coordinates, that is, between the surface coordinates on the outer surface of the 3D object and image coordinates assigned to the surface coordinates. FIG. 2 represents an outer surface A of a 3D object and a 2D image plane A having color information of surface coordinates. Referring to FIG. 2, surface coordinates (x1, y1, z1) of the outer surface A may correspond to image coordinates (u1, v1), and the transformation matrix may represent a correspondence between all surface coordinates on the outer surface A and image coordinates on the image plane A. The color processor 108 may select target coordinates that have the greatest impact on color information assigned to the inner coordinates among the surface coordinates on the outer surface of the 3D object, and obtain image coordinates corresponding to the target coordinates by using the transformation matrix. The color processor 108 may assign the color information of the obtained image coordinates to the inner coordinates.

Figure 3:
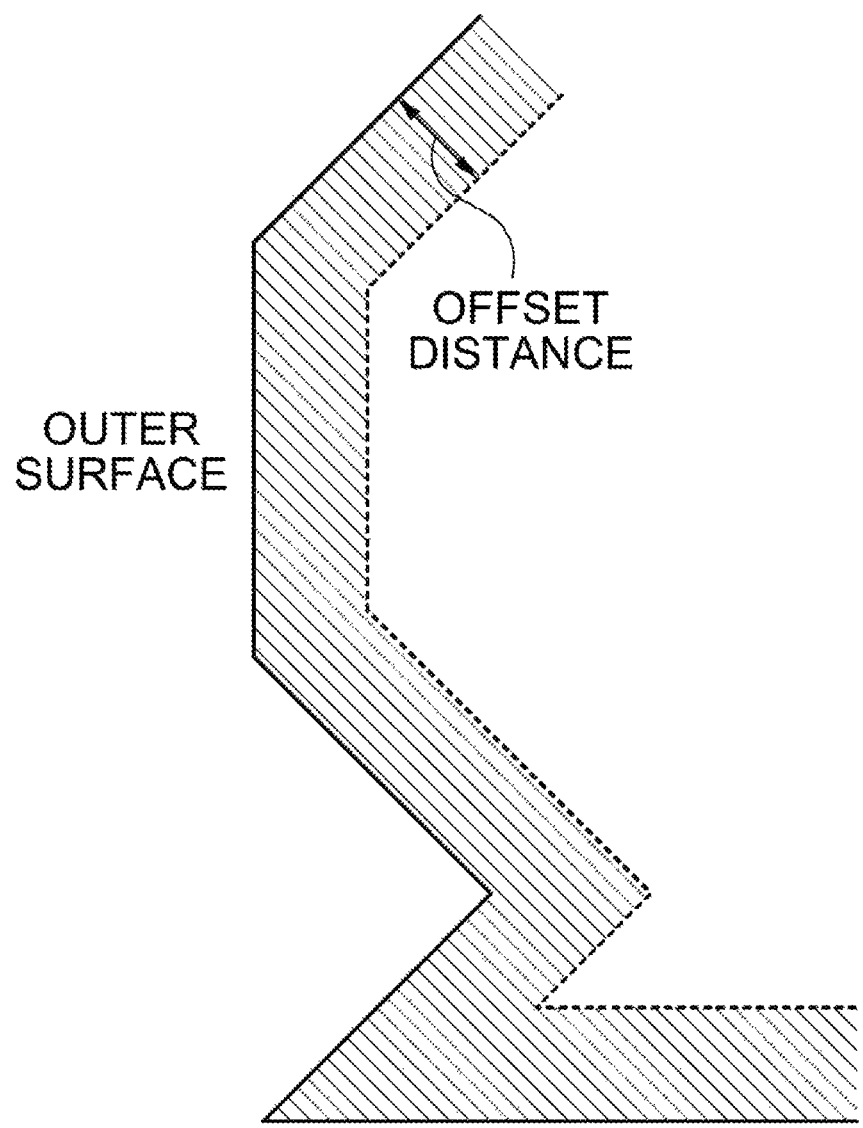
FIG. 3 is a diagram illustrating an offset distance according to an exemplary embodiment of the present invention.

FIG. 3 is a diagram illustrating an offset distance according to an exemplary embodiment of the present invention. As described above, the coordinate extractor 106 may extract inner coordinates that exist inside a 3D object and are positioned within an offset distance that is set from an outer surface. The offset distance may be 3 cm, 5 cm, etc. Referring to FIG. 3, because only inner coordinates positioned within the offset distance set from the outer surface of the 3D object among coordinates existing in the 3D object are assigned color information, the amount of calculation of an assignment of color information can be minimized.

Figure 4:
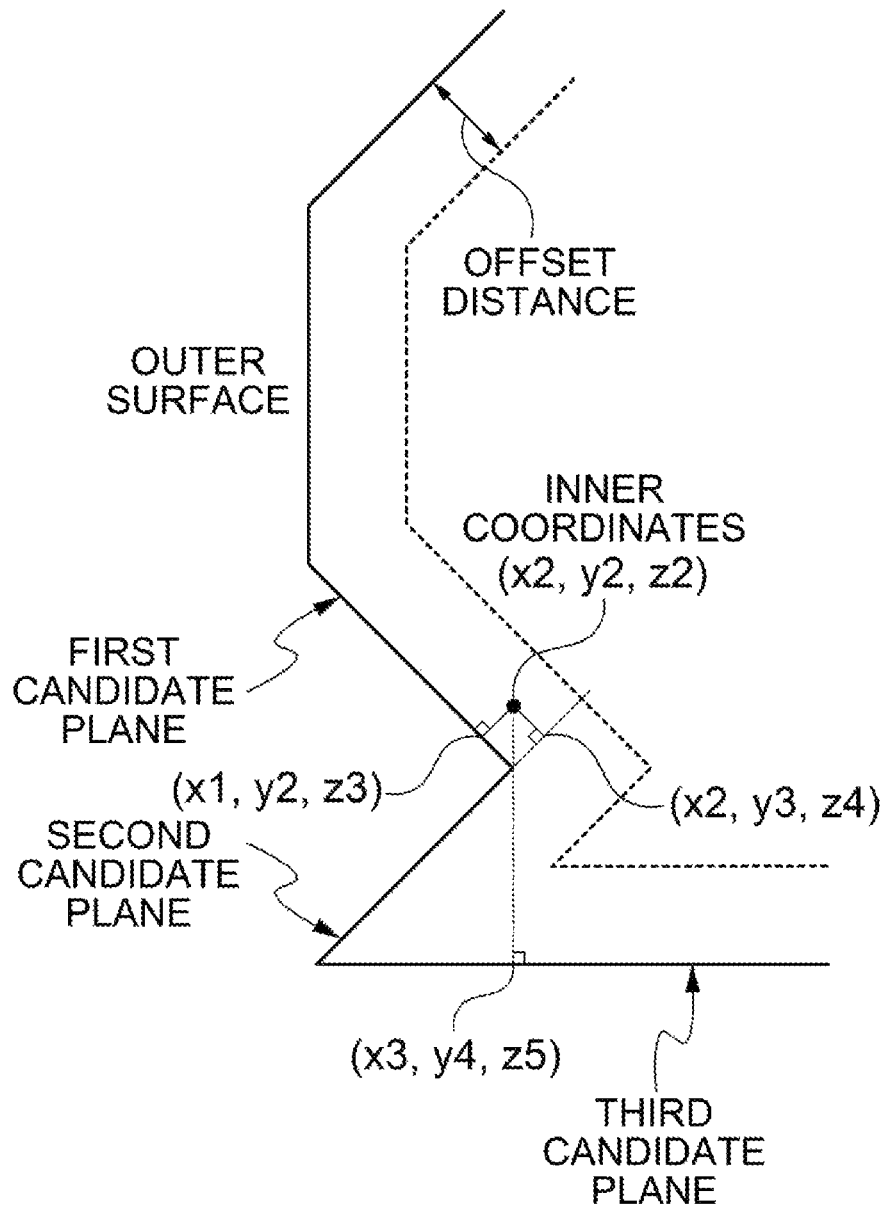
FIG. 4 is a diagram showing a method of selecting target coordinates in a color processor according to an exemplary embodiment of the present invention.
Figure 5:
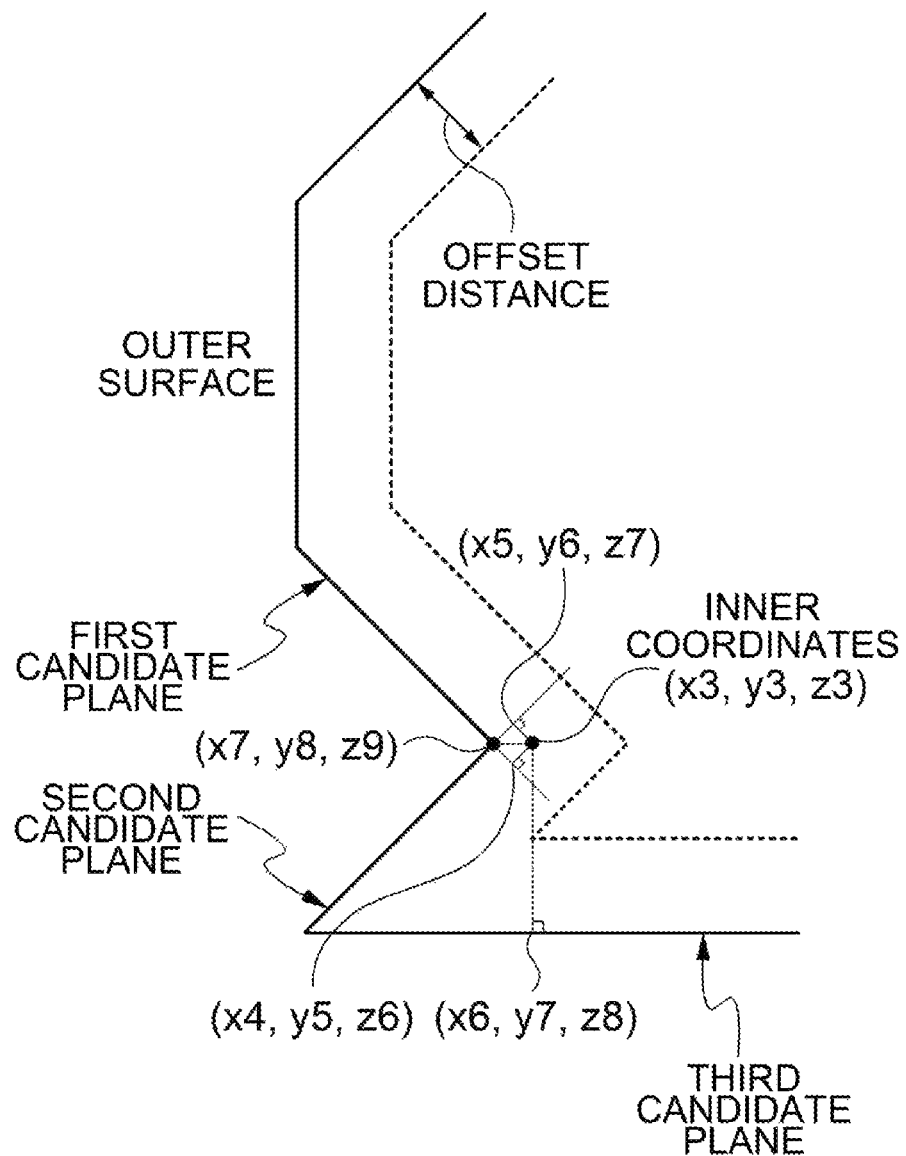
FIG. 5 is a diagram showing a method of selecting target coordinates in a color processor according to an exemplary embodiment of the present invention.

FIGS. 4 and 5 are views illustrating a method of selecting target coordinates in the color processor according to an exemplary embodiment of the present invention. As described above, the color processor 108 determines one or more candidate planes among a plurality of outer planes and extracts coordinates whose distance to inner coordinates is shortest among coordinates on the candidate plane with respect to each of the one or more candidate planes.

Referring to FIG. 4, when a first candidate plane to a third candidate plane are determined with respect to inner coordinates (x2, y2, z2), the color processor 108 may extract coordinates (x1, y2, z3) whose distance to the inner coordinates is the shortest among coordinates on the first candidate plane, coordinates (x2, y3, z4) whose distance to the inner coordinates is the shortest among coordinates on the second candidate plane, and coordinates (x3, y4, z5) whose distance to the inner coordinates is shortest among coordinates on the third candidate plane. The color processor 108 may determine whether each of the extracted coordinates (x1, y2, z3), (x2, y3, z4) and (x3, y4, z5) exist on the outer surface of the 3D object.

As shown in FIG. 4, the coordinates (x1, y2, z3) and the coordinates (x3, y4, z5) exist on the outer surface of the 3D object, whereas the coordinates (x2, y3, z4) do not exist on the outer surface of the 3D object. Accordingly, the color processor 108 may select surface coordinates (x1, y2, z3) whose distance to the inner coordinates (x2, y2, z2) is the shortest, between surface coordinates (x1, y2, z3) and surface coordinates (x3, y4, z5), as the target coordinates.

Referring to FIG. 5, when a first candidate plane to a third candidate plane are determined with respect to inner coordinates (x3, y3, z3), the color processor 108 may extract coordinates (x4, y5, z6) whose distance to the inner coordinates is the shortest among coordinates on the first candidate plane, coordinates (x5, y6, z7) whose distance to the inner coordinates is the shortest among coordinates on the second candidate plane, and coordinates (x6, y7, z8) whose distance to the inner coordinates is shortest among coordinates on the third candidate plane.

As shown in FIG. 5, the coordinates (x6, y7, z8) exist on an outer surface of a 3D object, whereas the coordinates (x4, y5, z6) and (x5, y6, z7) do not exist on the outer surface of the 3D object. However, since a distance between the inner coordinates (x3, y3, z3) and surface coordinates (x6, y7, z8) exceeds an offset distance, the color processor 108 may select surface coordinates (x7, y8, z9) whose distance to the inner coordinates (x3, y3, z3) is shortest, among surface coordinates positioned on an edge or a vertex formed by outer surfaces on the first to third candidate planes as the target coordinates. The coordinates (x7, y8, z9) may represent an edge formed by an outer surface on the first candidate plane and an outer surface on the second candidate plane.

That is, the color processor 108 extracts coordinates whose distance to inner coordinates is shortest among coordinates on a candidate plane with respect to each candidate plane, and if coordinates corresponding to surface coordinates on the candidate plane exist among the extracted coordinates, selects surface coordinates whose distance to the inner coordinates is the shortest among the surface coordinates as target coordinates, and if coordinates corresponding to the surface coordinates on the candidate plane do not exist among the extracted coordinates, selects surface coordinates whose distance to the inner coordinates is the shortest among surface coordinates positioned on an edge or a vertex formed by the outer surfaces on the candidate planes as the target coordinates.

Figure 6:
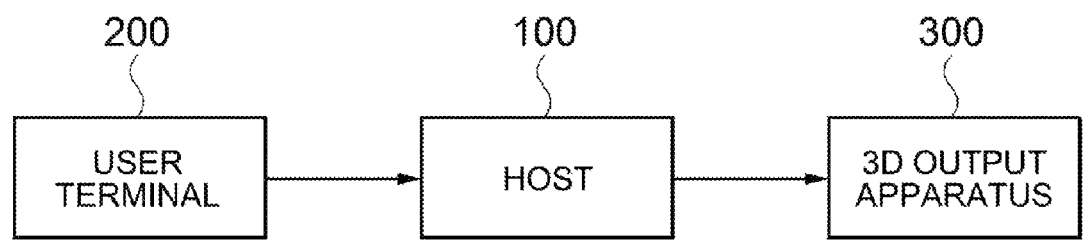
FIG. 6 is a diagram illustrating an example to which a 3D object color processing system according to an exemplary embodiment of the present invention is applied.

FIG. 6 is a diagram illustrating an example to which a 3D object color processing system 100 according to an exemplary embodiment of the present invention is applied. FIG. 6 illustrates a host model to which the 3D object color processing system 100 is applied. The 3D object color processing system 100, as a host, may process a color of a 3D object between a user terminal 200 and a 3D output apparatus 300. A user may transmit a 3D modeling file to the host 100 through the user terminal 200, and a host 100 (hereinafter, designated by the same reference numeral as the color processing system 100) may generate per-layer images through the above described method and transmit the generated per-layer images to the 3D output apparatus 300. The 3D output apparatus 300 may output the per-layer images received from the host 100 in a consecutive manner. The user terminal 200 may represent a desktop computer or a note book, and the 3D output apparatus 300 may represent a 3D printer.

Figure 7:
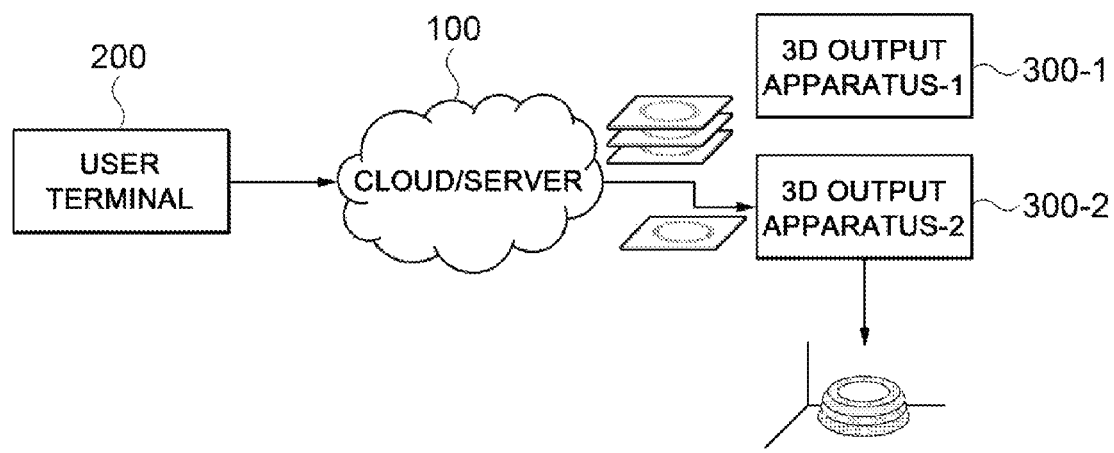
FIG. 7 is a diagram illustrating another example to which a 3D object color processing system according to an exemplary embodiment of the present invention is applied.

FIG. 7 is a diagram illustrating another example to which a 3D object color processing system 100 according to an exemplary embodiment of the present invention is applied. FIG. 7 illustrates a network model to which the 3D object color processing system 100 is applied. The 3D object color processing system 100, as a cloud or a sever, may process a color of a 3D object between a user terminal 200 and a plurality of output apparatuses 300-1, 300-2 . . . and 300-n. A user may transmit a 3D modeling file to a cloud/server 100 (hereinafter, designated by the same reference numeral as the color processing system 100) through the user terminal 200, and the cloud/server 100 may generate per-layer images through the above described method and transmit the generated per-layer images to the 3D output apparatuses 300-1, 300-2 . . . and 300-n. The 3D output apparatuses 300-1, 300-2 . . . and 300-n may output the per-layer images received from the cloud/server 100 in a consecutive manner.

Figure 8:
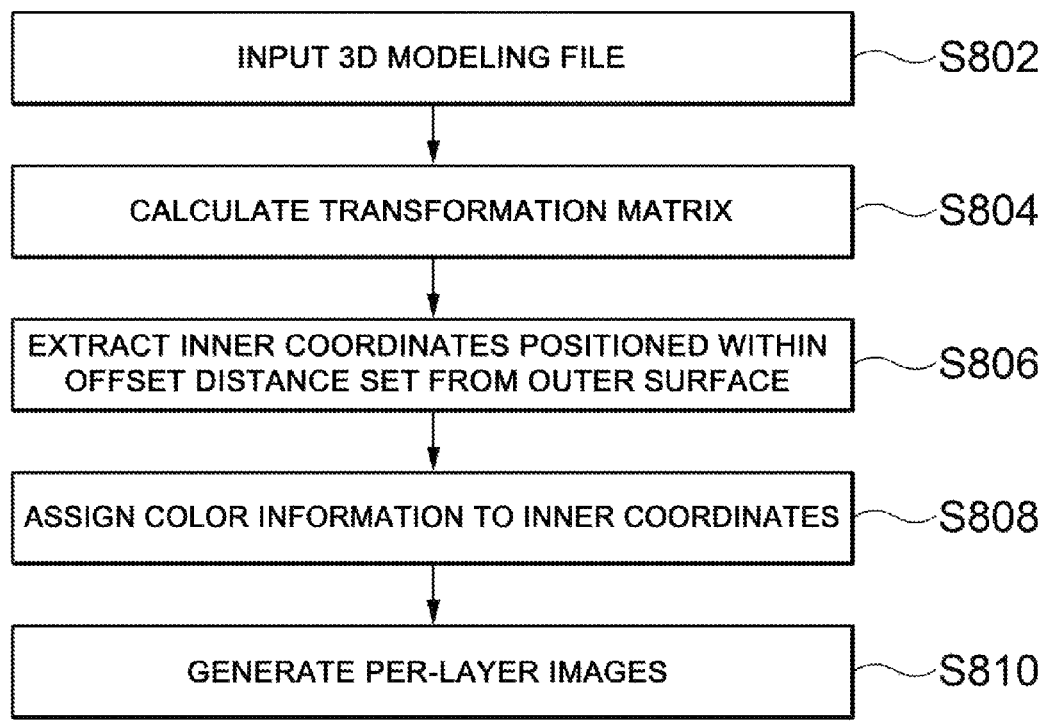
FIG. 8 is a flowchart showing a method for processing a color of a 3D object according to an exemplary embodiment of the present invention.

FIG. 8 is a flowchart showing a method for processing a color of a 3D object according to an exemplary embodiment of the present invention, in which the method is described as being divided in a plurality of steps, but at least some steps may be executed in a reverse order, may be executed in combination with another step, may be omitted, may be sub-divided and executed, or may be performed with one or more additional steps that are not shown.

The file input part 102 receives a 3D modeling file that includes appearance information of a 3D object and color information of an outer surface of the 3D object (S802). The 3D modeling file is a file used to output the 3D object from a 3D output apparatus, such as a 3D printer. For example, the 3D modeling file may be an OBJ file, a VRML file, or an AMF file.

The matrix calculator 104 calculates a transformation matrix by using the 3D modeling file received from the file input part 102 (S804). The transformation matrix means a matrix that represents a correspondence (a correlation) between surface coordinates on the outer surface of the 3D object and color information assigned to the surface coordinates, that is, image coordinates.

The coordinate extractor 106 extracts inner coordinates that exist inside the 3D object and positioned within an offset distance that is set from an outer surface of the 3D object (S806). The inner coordinates represent coordinates which are assigned color information among coordinates existing inside a 3D object.

The color processor 108 assigns color information to the inner coordinates by using appearance information of the 3D object and color information of the outer surface of the 3D object (S808). Step S808 will be described in detail with reference to FIG. 9.

The slicing part 110 generates per-layer images for outputting the 3D object (S810). The color processor 108 may assign color information to all of the inner coordinates positioned within the offset distance that is set from the outer surface, thereby generating a 3D image that represents an appearance of the 3D object and represents colors of an inside and an outside of the 3D object. The slicing part 110 may slice the 3D image, thereby generating 2D per-layer images. The slicing part 110 may transmit the generated per-layer images to the 3D output apparatus, and the 3D output apparatus may consecutively output the per-layer images received from the slicing part 110.

Figure 9:
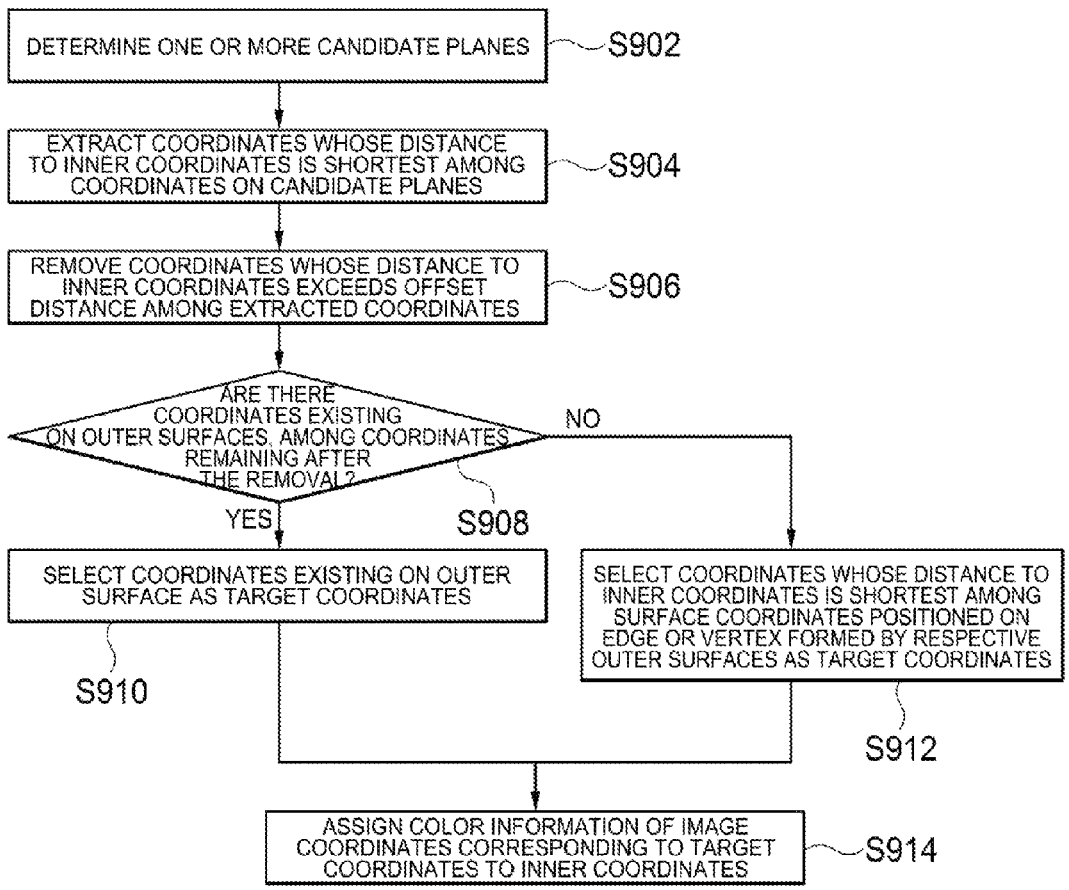
FIG. 9 is a flowchart showing step S808.

FIG. 9 is a flowchart showing step S808.

The color processor 108 may determine one or more candidate planes among a plurality of outer planes that are formed by extending a plurality of outer surfaces constituting a 3D object (S902). For example, the color processor 108 may determine one or more outer planes whose shortest distance from inner coordinates is within a preset value among the plurality of outer planes as the candidate planes.

The color processor 108 may extract coordinates whose distance to the inner coordinates is the shortest among coordinates on the candidate plane with respect to each of the candidate planes (S904).

The color processor 108 removes coordinates whose distance to the inner coordinates exceeds the offset distance among the coordinates extracted in step S904 (S906).

The color processor 108 determines whether there are coordinates existing on the outer surface of the 3D object among coordinates remaining after the removal in step S906 (S908).

If there are coordinates existing on the outer surface of the 3D object among coordinates remaining after the removal in step S906, the color processor 108 may select the coordinates existing on the outer surface of the 3D object among the coordinates remaining after the removal as the target coordinates (S910).

If there are no coordinates existing on the outer surface of the 3D object among the coordinates remaining after the removal in step S906, the color processor 108 may select surface coordinates whose distance to the inner coordinates is the shortest among surface coordinates positioned on an edge or a vertex formed by the outer surfaces on the candidate planes as the target coordinates (S912).

The color processor 108 may assign color information of image coordinates corresponding to the target coordinates to the inner coordinates (S914). The color processor 108 may obtain image coordinates corresponding to the target coordinates by using a transformation matrix, and may assign color information of the obtained image coordinates to the inner coordinates.

Meanwhile, exemplary embodiments of the present invention may include a program to perform the methods described in the specification on a computer and a computer-readable storage medium including the program. The computer-readable storage medium may include a program instruction, a local data file, a local data structure, or a combination of one or more of these. The medium may be designed and constructed for the present invention, or generally used in the computer software field. Examples of the computer-readable storage medium include hardware devices constructed to store and execute a program instruction, for example, a magnetic media such as hard disks, floppy disks, and magnetic tapes, optical media such as compact-disc read-only memories (CD-ROMs) and digital versatile discs (DVDs), read-only memories (ROM), random access memories (RAM), and flash memories. The program instruction may include a high-level language code executable by a computer through an interpreter in addition to a machine language code made by a compiler.

It should be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

DESCRIPTION OF REFERENCE NUMBERS

100: 3D object color processing system
102: file input part
104: matrix calculator
106: coordinate extractor
108: color processor
110: slicing part
112: database
200: user terminal
300: 3D output apparatus

What is claimed is:

1. A system for processing a color of a three-dimensional (3D) object, the system comprising:
a file input part executed by a hardware device configured to receive a 3D modeling file that comprises a plurality of surface coordinates on a plurality of outer surfaces that form a 3D object and a plurality of image coordinates corresponding to the plurality of surface coordinates;
a coordinate extractor executed by a hardware device configured to extract inner coordinates of the 3D object within an offset distance set from the outer surface of the 3D object; and
a color processor configured to determine at least one candidate plane among a plurality of outer planes formed by extending the plurality of outer surfaces, extract coordinates among coordinates on the candidate plane, whose distance to the inner coordinates is the shortest with respect to each of the at least one candidate plane, select one of the plurality of surface coordinates on the candidate plane as target coordinates based on the extracted coordinates, and assign color information of image coordinates corresponding to the target coordinates to the inner coordinates,
wherein, in response to at least one surface coordinates on the candidate plane correspond to the extracted coordinates, the color processor is configured to select surface coordinates, among the at least one surface coordinates on the candidate planes whose distance to the inner coordinates is shortest, as the target coordinates.

2. The system of claim 1, wherein the color processor is configured to determine at least one outer plane, among the plurality of outer planes whose shortest distance from the inner coordinates is smaller than a preset value, as the candidate planes.

3. The system of claim 1, wherein in response to no surface coordinates on the candidate plane correspond to the extracted coordinates, the color processor is configured to select surface coordinates, among surface coordinates positioned on an edge or a vertex formed by the outer surfaces on the candidate planes whose distance to the inner coordinates is shortest, as the target coordinates.

4. The system of claim 1, wherein in response to a distance from the target coordinates to the inner coordinates is equal to or smaller than the offset distance, the color processor is configured to assign color information of image coordinates corresponding to the target coordinates to the inner coordinates.

5. A method for processing a color of a three-dimensional (3D) object, the method comprising:
  receiving, by a file input part, a 3D modeling file that comprises a plurality of surface coordinates on a plurality of outer surfaces that form a 3D object and a plurality of image coordinates corresponding to the plurality of surface coordinates;
  extracting, by a coordinate extractor, inner coordinates of the 3D object within an offset distance set from the outer surface of the 3D object; and
  determining, by a color processor, at least one candidate plane among a plurality of outer planes formed by extending the plurality of outer surfaces;
  extracting, by a color processor, coordinates among coordinates on the candidate plane, whose distance to the inner coordinates is the shortest with respect to each of the at least one candidate plane;
  selecting, by a color processor, one of the plurality of surface coordinates on the candidate plane as target coordinates based on the extracted coordinates; and
  assigning, by a color processor, color information of image coordinates corresponding to the target coordinates to the inner coordinates
  wherein the selecting of the target coordinates based on the extracted coordinates comprises, in response to at least one surface coordinates on the candidate plane correspond to the extracted coordinates, selecting surface coordinates, among the at least one surface coordinates on the candidate planes whose distance to the inner coordinates is shortest, as the target coordinates.

6. The method of claim 5, wherein the determining of at least one candidate plane comprises determining at least one outer plane, among the plurality of outer planes whose shortest distance from the inner coordinates is smaller than a preset value, as the candidate plane.

7. The method of claim 5, wherein the selecting of the target coordinates based on the extracted coordinates comprises, in response to no surface coordinates on the candidate plane correspond to the extracted coordinates, selecting surface coordinates, among surface coordinates positioned on an edge or a vertex formed by the outer surfaces on the candidate planes whose distance to the inner coordinates is shortest, as the target coordinates.

8. The method of claim 5, wherein the assigning of color information of image coordinates corresponding to the target coordinates to the inner coordinates comprises, in response to a distance from the target coordinates to the inner coordinates is equal to or smaller than the offset distance, assigning color information of image coordinates corresponding to the target coordinates to the inner coordinates.

* * * * *